March 12, 1935. J. BIJUR 1,993,732
LUBRICATION
Filed Dec. 17, 1930 2 Sheets-Sheet 1
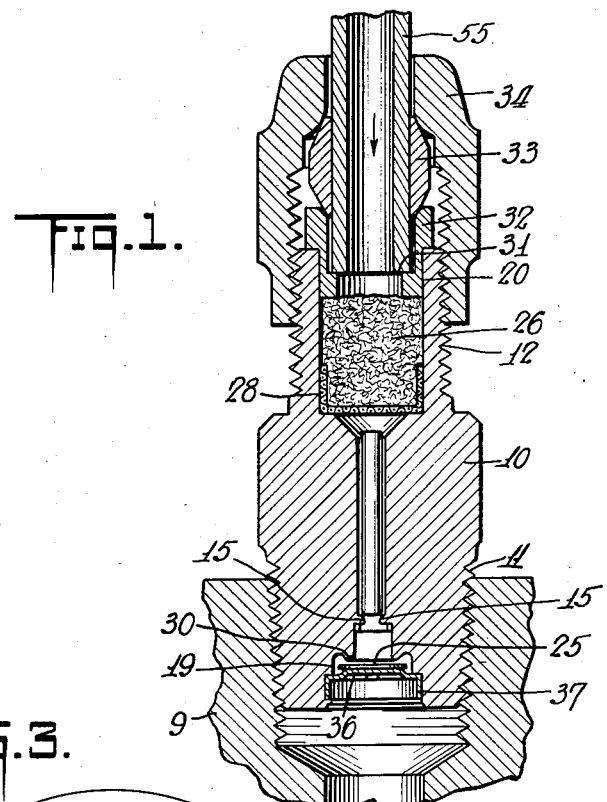
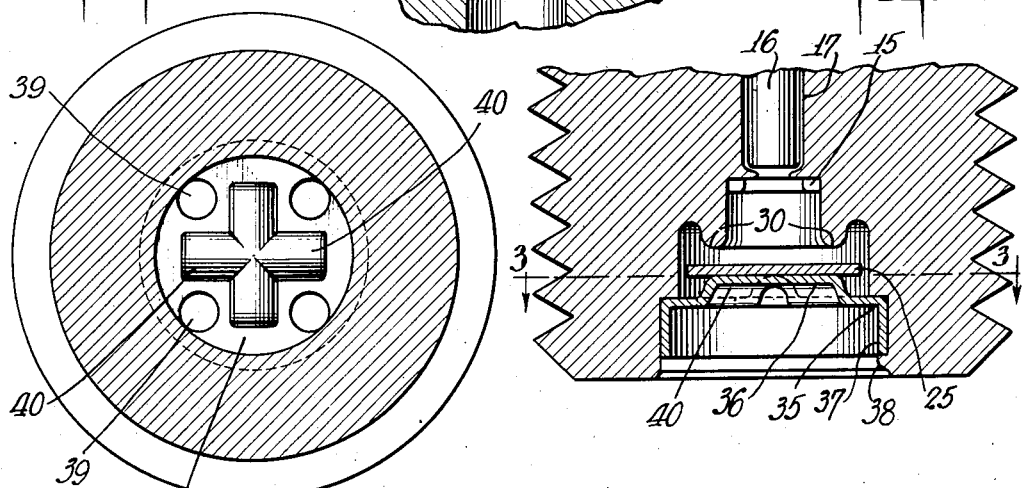
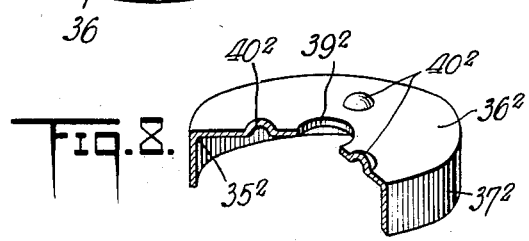
INVENTOR
Joseph Bijur
BY
ATTORNEYS March 12, 1935.  J. BIJUR  1,993,732
LUBRICATION
Filed Dec. 17, 1930   2 Sheets-Sheet 2
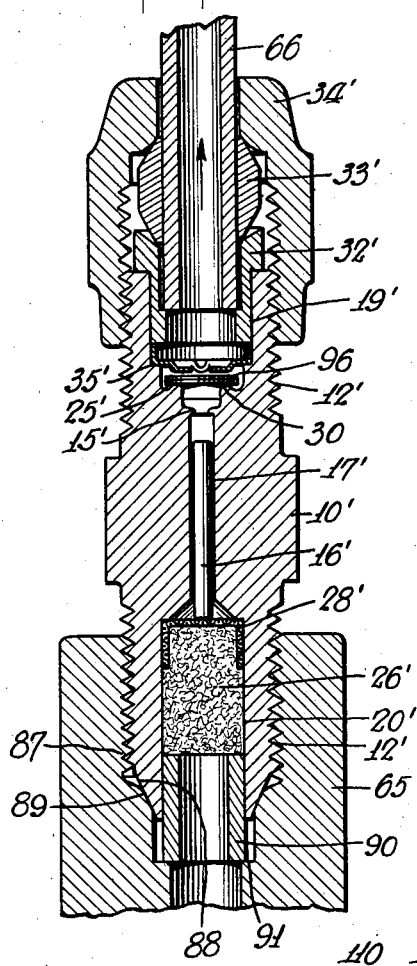
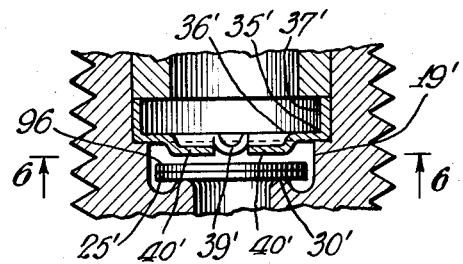
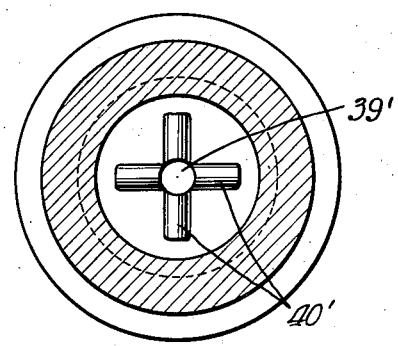
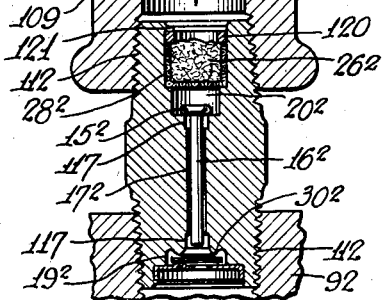
INVENTOR
Joseph Bijur
BY
ATTORNEYS Patented Mar. 12, 1935

1,993,732

UNITED STATES PATENT OFFICE 1,993,732

LUBRICATION

Joseph Bijur, New York, N. Y., assignor to Auto Research Corporation, a corporation of Delaware Application December 17, 1930, Serial No. 502,928

26 Claims. (Cl. 184—7)

My invention relates primarily to lubrication and although of broad application, is especially concerned with valved flow controlled devices of the character described in my Patents Nos. 1,632,772 and 1,734,027.

In common with said patents my invention is directed to flow control devices which, when used as outlets of a central lubricant distributing system, shall assure proportioning of the lubricant in a predetermined manner. More especially it is directed to valved devices of the character described, designed to prevent leakage during the intervals between pressure applications, even though the flow control devices be at substantially different levels, the valves of which devices shall yet respond promptly to applied pressures even though of very small magnitude.

It is an object of this invention to provide a compact, sensitive and substantially unitary valve device which may be readily assembled in a structure or fitting with other flow controlling elements, such as a restriction and/or a strainer, the correct functioning of which is not dependent upon any predetermined correlation with said other elements, and which valved device is adapted for use per se apart from the flow control devices.

In a system involving drip plugs of the type disclosed and claimed in my prior Patent No. 1,734,027 and especially where the valve is between the restriction and the bearing, such valve under oil propulsive pressure might tend to flex and seal the flow passage from the valve to the parts therebeyond and thereby inhibit discharge to the bearing.

As disclosed in my prior patents, the present invention makes use of a freely-moving valve disk, preferably of a woven, knitted or matted fabric, impregnated with varnish or oil, particularly that material known as oil- or varnish-silk. A disk of this material has sufficient flexibility and softness to yield and take the impress of a hard valve seat annulus, such as is used in a preferred embodiment, to prevent return flow of air or other fluid, but on the other hand it is so soft and flexible that it might tend to collapse into and seal openings in an improperly constructed valve retainer which might be employed to sustain said valve disk when it has been unseated during the ejection of lubricant or other liquid.

It is therefore also an object of this invention to obviate this difficulty, and the object is accomplished by constructing the valve retainer with a series of discontinuous projections or embossings and/or stiffening or backing the oil- or varnish-silk disk so that the tendency for the limber valve to collapse into the outlet opening or openings in the valve retainer between said projections or embossings will be substantially eliminated.

Other objects are in part obvious and in part pointed out hereinafter.

In a preferred embodiment, the valve chamber is made relatively flat, of somewhat but not materially greater height than the thickness of the valve disk so that said disk is always very close to its retainer and seat, and of slightly greater diameter or width to guide said disk in its reciprocation between its seat and its retainer, whereby there will be minimum valve motion and any tendency of the flexible valve disk to fold up or to collapse toward the sides of the valve chamber will be substantially prevented.

In common with the control devices of my aforementioned patents, in said embodiment the valve structure is incorporated in a unitary device or pipe fitting, which also embodies a flow restriction, and/or a strainer, said valve chamber being most desirably placed at the outlet of said fitting after the restriction.

In the accompanying drawings in which is shown one or more of the various possible embodiments of the features of this invention:

Figs. 1, 2, and 3 are views in section of one embodiment of a drip plug, Figs. 2 and 3 being detailed side sectional and top views of the valve structure shown on a large scale;

Figs. 4, 5, and 6 are views of another embodiment, Figs. 5 and 6 being detailed side sectional and top views of the valve structure; and Figs. 7 and 8 are views of another embodiment, Fig. 8 being a perspective view, partly in section, of the valve retainer.

The check valve fitting or drip plug construction shown in Figs. 1, 2 and 3, is adapted to be attached to bearings at the terminals of the conduit system and comprises an elongated body 10 preferably of brass or duraluminum having pipe threads 11 at one end for application to a bearing 9 or other mounting structure and a machine thread 12 at the other end for attachment by means of an appropriate coupling of the extremity of one of the feed pipes. Suitable flow restriction means are employed consisting in this embodiment of a length of pin or plug 16, preferably of brass, of accurately predetermined diameter substantially filling a longitudinal bore 17 of accurately predetermined diameter, thereby forming a highly restricted annular crevice of substantial length, the outer ends of said bore being enlarged to form the inlet socket 20 and the outlet socket 19. Change in diameter of the pin will change the amount of restriction and also the flow rating of the device. The portion of the bore adjacent to outlet socket is provided with staking 15 adapted to hold the pin 16 in position and keep it from sliding into the outlet socket and opening the valve to be subsequently described.

In the inlet socket 20 is provided a strainer 26 which may take the form of a wad or plug of wool felt preferably backed by a cup 28 of metal mesh. Adjacent the bottom of the outlet socket 19 is formed the annular seat 30 for the free loose floating valve 25, said seat consisting of a ridge extending entirely around the entrance of bore 17 into the socket 19. Closing the socket 19 is a retainer 35 for the loose floating valve consisting of a dished stamping, the flange 37 of which contacts frictionally with the wall of the socket 19 and is held in position by means of a series of staking 38.

The floor or base 36 of the dished member 35 is provided with a cruciform embossing 40 (see also Figs. 2 and 3), in the depressions between which are annularly arranged the outlet openings 39. The principal function of the cruciform embossing 40 is to prevent the valve from flexing against and sealing the outlets 39 in the retainer floor 36 and thus to insure ready emission of lubricant.

The valve 25 should be of such a material as will seat completely upon the annular seat 30 upon slight vacuums or suction as would be caused by the tension of about ½ inch to 12 inch lubricant column in the piping of the system which is frequently incurred in feeding the chassis bearings of an automobile. The valve material should also be substantially impervious and chemically inert to oil and non-sticking, which properties are possessed in a high degree by well-baked oil-silk or varnish-silk, the preferred valve material.

As shown, the drip plug 10 may be coupled to a pipe end 31 by the compression coupling sleeve 33 clamped between a coupling nut 34 threaded upon the fitting 10 and a thimble 32, telescoped into the socket 20, which latter functions in addition to hold the filter 26 annularly in position and to stop the pipe end 31.

In operation, the valve 25 will be urged toward the retainer 35 during emission of lubricant, the ridges 40 of which will prevent the valve from sealing the openings 39, even when the propulsion pressure becomes relatively high. In the intervals between lubrications the valve 25 of a fitting at higher level will be sucked toward its seat 30 by the tension of oil contained in a drooping pipe line to a bearing at lower level, and the limber valve adapts itself closely to said seat to prevent air infiltration.

It will be understood that instead of the specific valve and valve retainer structures above described, those of any, of the alternative embodiments set forth below might be substituted.

Upon Figs. 4, 5 and 6 is shown a junction drip plug of slightly different construction than that shown in Figs. 1, 2 and 3 (similar parts being designated by the same numerals primed), which may be fitted into a socketed junction 65 attached to a supply conduit upon a chassis frame and which maintains filled an upwardly extending tail pipe leading to bearings above the chassis level. The outlet end of the drip plug is connected to a pipe conduit 66 by an arrangement similar to that used to couple a pipe conduit to the inlet end of the embodiment shown in Fig. 1. Both ends of the fitting of Fig. 4 are provided with machine threads 12' the inner threaded end of the body 10' screwing into a tapped socket 87 in a junction element 65 within which it is wedged by means of its tapered end 88 and a cooperating bevel 89 adjacent the bottom of the socket. Telescoped into the inlet socket 20' and holding the felt 26' in position is the sleeve 90 which, when the fitting is installed, may be bottomed on the ledge 91 in the socket 87.

In this embodiment the valve disk 25' of oil-silk is shown stiffened, to limit its flexure during use, without impairing satisfactory seating. Such stiffening may be accomplished by a light backing disk 96 of sheet metal, such as brass. While the backing disk may be cemented to the valve, it is ordinarily preferred to have the said disks separate and in superposed relation as shown.

While the valve retainer of Fig. 1 could be used to advantage, I have shown a modified construction, fully shown upon Figs. 5 and 6, in which the central portion of the base 36' of the retainer 35' is embossed with the radial ridges 40' and with a central opening 39'.

Upon Figs. 7, 8 and 9, is shown still another embodiment which is in part of similar construction as the embodiments of Figs. 1 and 4, utilizing the stiffened valve disk of Fig. 4 (similar parts being designated by the same numerals with a superior 2) and of the T type for utilization in the run of a feed line. The feed line 55 which is split or interrupted adjacent the bearings is coupled together and to the drip plug (both ends of which are pipe threaded) by means of said T head 109, provided with the tapped sockets 110, cooperating with the coupling bushings 111 and the double tapered coupling sleeves 112. The restriction pin $16^2$ is prevented from sliding into the outlet chamber $19^2$ by the heading $15^2$ upon its own body and the ends of the bore are counterbored at 117 to permit of more ready entrance and exit of lubricant. The felt filter $26^2$ is outwardly held in position by the ring 120 retained by the staking 121.

Illustratively a further modified form of valve retainer is shown (see Figs. 7 and 8) which is provided with three spaced projections or embossments $40^2$ preferably equidistant from the central opening $39^2$, and from each other.

The drip plugs and check valve arrangements of the present invention, while are more especially intended for continuous systems may also be applied advantageously to manually operated or to shot systems. The construction of the restrictions and filter part of the metering device and the functioning thereof in connection with central lubricating systems is set forth more fully in my Patents Nos. 1,632,772, 1,732,212 and 1,734,027.

While the various elements of the metering unit or drip plugs may be made in proportion or dimensions suited to the particular use to which the device is put, the application of the device for automobile chassis lubricating renders certain dimensions and proportions particularly suitable for universal application to widely differing makes of automobiles. For such purposes the valve chamber may be of such height and width as to just clear the sides of the disk valve and permit movement thereof between the valve seat and the valve retainer of between 1/64 inch to 1/32 inch. The oil-silk valve disk may have a thickness of about 0.008 inch and a diameter of about 0.140 inch and in the embodiments of Figs. 4 and 7, the metallic disks, which are preferably of brass, may have approximately the same diameter and thickness. In the case of the valve retainers, the embossing may be about 0.010 inch to 0.015 inch in height and extend over such an area as to be covered substantially or in major part by the valve. With dimensions of this character the spaces within the valve chamber will be so limited as to remain filled with lubricant at all times. This will have the advantageous effect of floating the valve and ensuring a more rapid response thereof to slight closing vacuums in addition to wetting the oil-silk disk and making it seat more accurately.

In commercial utilization of the valve units or drip plugs described, it is customary to pre-oil or to test the unit or plug with lubricant. In some cases, however, such units or plugs may be permitted to stand for considerable periods of time without being wet with lubricant. Since the oil-silk valve disks, preferably employed, may be tacky and tend under these conditions to stick either to the retainer or to the valve seat, it has been found advantageous to powder both sides of said silk disks with French chalk or some other powdering agent to eliminate such possibility.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

By the term "low ceiling" as utilized in the accompanying claims is meant that the valve chamber takes the form of a thin cylindrical section of much less height than diameter.

By the expression loose valve and/or floating valve, used in the specification and claims, is meant a disk valve which is positioned in a valve chamber so that it may float or move freely from the valve seat to the valve retainer upon forward flow of lubricant. In turn such a valve will be seated by return impulse or return flow of lubricant.

The expression loose or floating valve is utilized in the present application in contradistinction to the expression flap valve. Flap valves may be hinged to the side of the valve seat, or without being hinged may be caused always to contact at one of their edges with the valve seat. As contrasted to flap values of this character, there is no capillary effect in seating the valve of the present application, since it is altogether removed from the valve seat upon forward flow of lubricant. The valve of the present application is wholly seated by the tendency toward return flow of the lubricant.

The present application is a continuation in part of application Ser. No. 580,668, filed August 9, 1922, particularly in respect to Figs. 29 and 35 of said application and it is also a continuation in part of application Ser. No. 285,526, filed June 15, 1928, particularly Fig. 5 of said application.

The present application in common with said copending applications of the present applicant, discloses a drip plug or high restriction flow metering lubricating system, in which the drip plugs or high restriction metering fittings afford an obstruction to the flow of lubricant much higher than is afforded by either the piping lines or by the bearings. The valves to which the present application is primarily directed may be positioned ahead of or after the obstruction or may be located in separate fittings at various places upon the distributing system, and they are designed primarily in such drip plug distributing systems to prevent entry of air at a higher outlet and emission of lubricant at a lower outlet, as might be caused by siphoning from such upper outlet to such lower outlet. This will assure that the lines will be maintained substantially full of lubricant at all times.

Additionally, in common with said copending applications, the valves of the present application afford a very low or negligible obstruction to the flow of lubricant as compared to the obstructing effect of the drip plug outlets.

It is to be understood, however, that, although the valves of the present invention are primarily designed for drip plug distributing systems, they may be broadly utilized to valve the flow of oils and similar liquids and fluids.

I claim:—

1. A valve device for a lubricating installation comprising a casing and a valve, said casing being of slightly greater width than said valve and having a continuous ridge at one side for contact with the valve to close the passage to the device and a discontinuous projection at the other side for contact with the valve to permit ready emission through said device.

2. A valve device particularly adapted to be utilized upon a lubricating system comprising a valve casing with a low ceiling cylindrical valve chamber and a freely moving loose floating valve therein, one side of said casing forming a valve seat and the other side of said casing forming a valve retainer and being provided with a series of linear ridges and also with suitable outlet means from said chamber.

3. A valve device particularly adapted to be utilized upon a lubricating system comprising a body member, a low ceiling valve chamber therein, a valve seat formed at one face of said chamber, a valve retainer at the other face of said chamber and a freely moving valve within said chamber, the valve contacting side of the said retainer being provided with a series of ridges and a series of openings in the depressions between the ridges.

4. A valve device comprising a valve casing with a low ceiling cylindrical valve chamber and a freely moving valve disk therein, one side of which chamber forms a valve seat cooperating with the valve to prevent reverse flow through the device and the other side of which forms a valve retainer cooperating with the valve to permit forward flow, said retainer side being provided with two radial crossing ridges at right angles to each other associated with an outlet from the valve chamber.

5. In a lubricating system, a check valve device comprising a valve casing, a freely moving check valve therein and seats provided with inlet and outlet openings, respectively, at both sides of said casing, one of said seats having a circular ridge surrounding the inlet opening to the valve casing and the other of said seats having a cruciform projection adapted to prevent seating of said valve against the outlet opening.

6. In a lubricating system, a check valve device comprising a valve casing, a freely moving check valve therein and seats provided with inlet and outlet openings, respectively, at both sides of said casing, one of said seats having a circular ridge surrounding the inlet opening to the valve chamber and the other of said seats having a cruciform projection at the center of which is positioned the outlet opening from said casing.

7. A check valve device particularly adapted to be utilized in a lubricating system comprising a valve housing, a freely moving check valve therein and seats provided with projections and with centrally positioned inlet and outlet openings, respectively, at both sides of said housing, one of said seats being so shaped as to permit, and the other being so shaped as to prevent, the check valve from closing the respective opening.

8. In a lubricating system, a check valve device comprising a valve housing, a freely moving check valve therein and seats provided with inlet and outlet openings, respectively, at both sides of said casing, one of the seats having a circular ridge surrounding the inlet opening to the valve casing and the other of said seats having a series of spaced embossings substantially equidistant from the outlet opening from said casing and substantially equidistant from each other.

9. In a drip plug fitting for a lubricating installation comprising a restriction, a strainer and a freely moving disk valve; a valve chamber to contain said disk valve, said chamber being of slightly greater width than the disk valve and having a continuous ridge at one side for contact with the valve to close the passage through the drip plug and a discontinuous projection at the other side for contact with the valve to permit ready emission from said drip plug fitting.

10. A valve fitting particularly adapted to be utilized in a lubricating installation comprising a body provided with a bore, a socket at one end of said bore, said bore opening into the central bottom portion of said socket and an annular ridge around said opening, a retainer fitting in the outlet side of said socket and being provided with a series of openings positioned at a substantial distance away from the axis of the fitting and in depressed portions of the retainer and a loose floating valve within said socket.

11. In a lubricating installation comprising a fitting provided with a central bore enlarged to form sockets at either end thereof, a filter in the inlet socket and a loose floating valve in the outlet socket; a retainer in the outer portion of said outlet socket to limit the movement of the valve, the inner face of said retainer being provided with a series of radial crossing ridges and a series of openings adjacent the outer edges of said ridges in the valleys therebetween.

12. In a drip plug fitting provided with a flow metering device, with a strainer and with a freely moving loose floating valve; a low ceiling cylindrical chamber within the fitting, both bases of said cylindrical chamber being provided with cooperating projections and openings so shaped and positioned that passage through the drip plug will be closed when the valve is positioned against one base of the chamber and is opened when the valve is seated against the other base of the chamber.

13. A valve fitting for a lubricating system comprising a casing, a valve chamber within said casing, one side of which serves as a valve seat, a freely moving disk valve within said chamber, said chamber having a slightly larger diameter than the disk valve and being of slightly greater depth and said disk valve being composed of two disks, one of a soft, flexible valve-seating material and the other of a material substantially inflexible under lubricating pressures, said valve being entirely separated from its seat upon flow of lubricant past the valve.

14. A flow controlling fitting for a lubricating system having a body member with a valve chamber provided with an annular valve seat, a valve in said chamber and a retainer forming one side of said chamber, limiting the movement of the valve away from said seat, said valve consisting of a material having the seating properties of oil-silk and having a backing disk of sheet metal, said valve being entirely separated from its seat upon flow of lubricant past the valve.

15. In a lubricating system, a check valve device comprising a casing with inlet and outlet faces and a freely moving check valve therein adapted to contact either with the inlet or outlet faces of said casing, said inlet face serving as a valve seat, said valve being composed of superimposed disks of oil-silk and of brass, said valve being entirely separated from its seat upon flow of lubricant past the valve.

16. A check valve device for a lubricating installation comprising a casing with embossed outlet and inlet sides serving as seats and a valve enclosed therein cooperating with said seats, said casing being of slightly greater width than said valve and of slightly greater thickness so as to permit a movement of the valve of between about 1/64 inch to 1/32 inch, said inlet and outlet sides being provided with flow openings, and said embossments on said inlet and outlet sides being respectively arranged in respect to said openings, so that when the valve seats upon said inlet side, flow of lubricant through the device will be prevented, while when the valve seats upon said outlet side, such flow will be permitted.

17. A check valve device for a lubricating installation comprising a casing with embossed outlet and inlet sides serving as seats and a flat circular freely moving valve enclosed therein cooperating with said seats, said casing being of slightly greater width and thickness than said valve, said valve having an approximate thickness of 0.008 inch and an approximate diameter of 0.14 inch, said inlet and outlet sides being provided with flow openings, and said embossments on said inlet and outlet sides being respectively arranged in respect to said openings, so that when the valve seats upon said inlet side, flow of lubricant through the device will be prevented, while when the valve seats upon said outlet side, such flow will be permitted.

18. A flow controlling fitting having a body member with a valve chamber provided with a valve seat and a valve retainer, and a valve in said chamber adapted to reciprocate between said seat and said retainer, said valve consisting of an oil-silk disc, said valve chamber being of such a shape and size and said valve seat and valve retainer being so formed that the valve in contacting with the valve seat and in contacting with the valve retainer will lie respectively in spaced parallel planes.

19. In a lubricating system, a check valve comprising, in combination, a conduit member having an opening therethrough and a valve seat at one end of said opening, a shoulder formed in said member adjacent said valve seat, a limiting member abutting said shoulder, a projection on said limiting member extending toward the opening in said conduit member and adapted to retain said valve in parallel relationship to said valve seat, and a freely floating valve between said seat and said limiting member, said valve comprising a disk of silk fabric coated with oxidized oil.

20. In a lubricating system, a check valve, comprising, in combination, a conduit member having a recess terminating in a valve seat, a shoulder formed in said member adjacent said seat, a limiting member abutting said shoulder and having openings therethrough, a projection on said limiting member located centrally of said valve seat and extending toward said seat and above said openings, and a freely moving valve between said seat and said limiting member and beneath said seat, said projection being so spaced from said seat as to permit said valve to separate entirely from said seat.

21. In a lubricating system, a check valve comprising, in combination, conduit means including a valve seat, a freely movable valve for cooperating with said seat, said valve comprising a disk of silk fabric coated with oxidized oil, and means for supporting said valve in position entirely removed from its seat.

22. A check valve for lubricating systems, comprising, in combination, a valve seat having a small opening therethrough and a fabric disk valve adapted to be held against said seat solely by the tension due to tendency toward back flow of the lubricant, said fabric disk being sufficiently strong to withstand hydraulic pressure over the area of said opening and sufficiently flexible to encircle and form a tight seal around irregularities in said seat, said valve being entirely separated from its seat upon flow of lubricant past the valve.

23. In a lubricating system, a check valve, comprising, in combination, a conduit member having a valve seat, a limiting member adjacent said seat, and a freely floating valve between said seat and said member, said valve adapted normally to be held against said seat solely by the tension due to tendency toward back flow of the lubricant, said valve being entirely separated from its seat upon flow of lubricant past the valve.

24. In a lubricating system comprising a source of lubricant supply, pump means, and conduits leading from said pump means to the bearings to be lubricated; a check valve including a valve seat and a freely floating valve, said valve normally being held against its seat by the tension due to tendency toward back flow of the lubricant and adapted to be forced from its seat by the pressure created by said pump means, said valve being entirely separated from its seat upon flow of lubricant past the valve.

25. In a lubricating system, a check valve comprising, in combination, a conduit member having a valve seat, a freely floating valve normally held against said seat by the tension due to tendency toward back flow of the lubricant, and means for limiting the range of movement of said valve after said valve has moved entirely from said seat.

26. In a lubricating system, a check valve arrangement comprising a loose free disk valve, a conduit leading to said valve, a ridge around the outlet of said conduit at said valve forming a valve seat, a cylindrical shroud depending downwardly from adjacent said seat of larger diameter than the outlet of said conduit and encircling said valve and a retainer enclosed in said shroud to prevent excessive movement of the valve from its seat.

JOSEPH BIJUR.